United States Patent Office 2,898,671
Patented Aug. 11, 1959

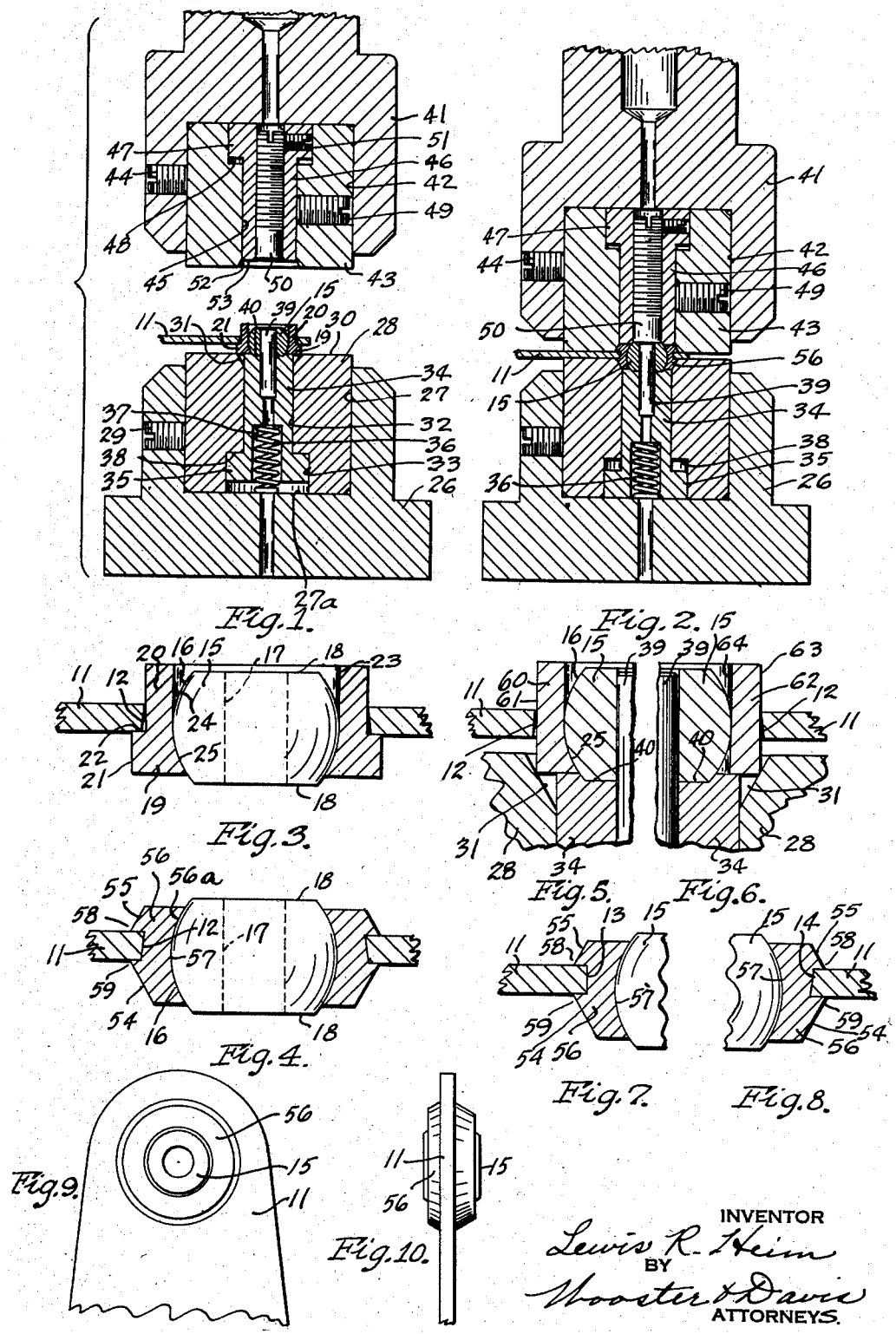

2,898,671

METHOD OF MOUNTING A SELF-ALIGNED BEARING IN A LEVER OR OTHER MACHINE ELEMENT

Lewis R. Heim, Fairfield, Conn., assignor to The Heim Company, Fairfield, Conn., a corporation of Connecticut Application February 16, 1955, Serial No. 488,652

3 Claims. (Cl. 29—149.5)

This invention relates to a method of mounting a self-aligned or self-aligning bearing in a lever or other machine element, and has for an object to provide an improved method for so mounting the bearing which may be performed quickly, and will effectively and accurately mount the bearing in proper position in the element, and which operation of mounting the self-aligned bearing member in its supporting bushing and mounting this bushing with the bearing member in the machine element may be performed as a single operation in suitable dies in a power press.

With the foregoing and other objects in view, I have devised the novel method with means by which it may be accomplished as illustrated in the accompanying drawing forming a part of this specification. It is, however, to be understood the invention is not limited to the specific details shown or described, but may embody various changes and modifications within the scope of the invention.

In this drawing:

Fig. 1 is a vertical section through a set of dies which may be used in a power press for carrying out this method, and showing the dies separated with the elements of the bearing and its mounting in position to be operated upon by these dies;

Fig. 2 is a similar section showing the dies closed at the completion of the method of mounting the bearing in the machine element;

Fig. 3 is a section on a larger scale showing one form of bushing and the bearing in the machine element preparatory to the forming and mounting operation;

Fig. 4 is a similar view showing the bearing mounted in the machine element;

Fig. 5 is a section similar to Fig. 3 with a portion of the lower die showing a slight modification;

Fig. 6 is a similar section showing another modification;

Fig. 7 is a section of one portion of a mounting for the bearing at the completion of the mounting operation showing a slight modification over Fig. 4;

Fig. 8 is a similar view showing another modification;

Fig. 9 is a side view of a lever or other machine element showing this bearing mounted therein, and Fig. 10 is an edge view looking from the right of Fig. 9.

In the illustration of the method shown in the drawing by way of example the method is described in connection with the mounting of a self-aligned bearing in a lever or other machine element comprising a substantially flat member 11 of suitable thickness and made of metal or other suitable material. This element is provided with an opening therethrough, which opening may be either straight or tapered as found desirable. In the arrangement of Fig. 3 it is indicated at 12 and tapered from the upper to the lower side of the element 11 with the larger diameter at the lower side. The same is true of Figs. 4, 5 and 6, but in Fig. 7 the opening indicated at 13 is substantially straight, while in Fig. 8 this opening 14 is tapered in the opposite direction from that of Figs. 3 to 6, or that is, with the larger diameter at the upper side of the element 11. The self-aligned or self-aligning bearing member is indicated at 15, of any suitable material, such, for example, as hardened steel having a spherical outer bearing surface 16 and a longitudinal plain bearing opening 17 therethrough. The opposite ends of this member may be substantially flat, as indicated at 18. This member may be also formed from other suitable metals or from sintered compressed powdered metal, and it may be hardened or heat-treated and accurately ground to size and shape.

This bearing member is mounted in the machine element 11 by a suitable mounting member comprising a bushing of suitable ductile material, preferably a suitable ductile metal. In the form of Fig. 3 this bushing indicated at 19 has a substantially cylindrical portion 20, and one end portion or flange 21 of larger diameter forming an annular shoulder 22. The bushing has a longitudinal passage 23 therethrough which at one end portion 24 is substantially cylindrical leading from one end of the bushing, and the other end portion 25 leading from the other end of the bushing comprises a portion of a substantially spherical surface of a size to receive and fit the outer surface of the bearing member 15. In mounting this bushing and the bearing member in the machine element 11, the bushing and the bearing member are placed with the cylindrical portion 20 of the bushing passing through the opening 12 in the machine element and the flange or shoulder 22 forming a stop to engage the lower surface of this element, then the bushing of ductile material is formed, or that is, the material is worked or coined, about the spherical bearing member 15 and the edges of the opening 12 in the machine element to mount the bearing member in the bushing and also interlock the bushing with the machine element to mount the bushing and the member in this element. This operation of forming or working the bushing about the bearing member 15 and about the edges of the opening in the machine element may be performed in different ways and by different mechanism, but preferably is performed in a set of dies in a power press, a form of which is shown in Figs. 1 and 2, as with these dies the method of mounting the bearing may be performed quickly and accurately in a single operation.

This set of dies as illustrated comprises a lower die shoe 26 which may be supported on the table of the press, and is provided with a recess 27 in which is seated a lower die block 28 which may be held in place by a set screw 29. This die block is provided in its top surface 30 with a tapered recess 31, and the die block 28 is provided with a vertical passage 32 leading from the bottom of this recess through the bottom of the block, and this passage has an enlarged lower portion 33. In this passage is mounted for limited vertical movement a die plug or member 34 which includes an enlarged head 35 in the enlarged portion 33 of the passage in the die member 28, this head being shorter than the length of this enlarged portion in the passage to permit limited vertical movement of the member 34, and a spring 36 seated in a socket 37 in the lower portion of the member 34 seats on the lower or bottom wall 27a of the socket 27 and tends to shift the member 34 upwardly, which movement is limited by the shoulder 38 at the top of the enlarged portion 33. This member 34 also carries a pilot pin 39 projecting from its upper end of the same size as the passage 17 in the bearing member 15 on which the bearing member may be placed to position and center it in the die. The upper end of the member 34 may also be provided with a recess 40 in which the lower end of the bearing member 15 may be seated, as shown in Fig. 1, with the lower end of the bushing 19 resting on the top of this member 34 and above the tapered recess 31, and with the machine element 11 resting on the shoulder 22 with the bushing extending through the opening 12 in this element.

The upper die arrangement, which is the movable portion of the die set, comprises a mounting block 41 having a recess 42 in its lower end in which is seated the upper die block 43 and which may be secured therein by the set screw 44. This die block is provided with a passage 45 therethrough in which is mounted for limited vertical adjustment an upper die plug or member 46 having an enlarged head 47 in an enlarged upper portion 48 of the passage. This member 46 may be secured by a set screw 49. Within the die member 46 is a vertically adjustable plug 50 having its lower end adjacent the lower end of the member 46, this member being threaded in the member 46 for vertical adjustment therein and may be secured in adjusted positions by set screw 51. The lower end of the die block 43 is provided with a tapered recess 52 in alignment with the recess 31 in the lower die block, and the lower end 53 of the member 46 is positioned at the top of this recess in proper position to form the upper end of the bushing 19 by longitudinal pressure thereon as the upper die is lowered against the lower die, as shown in Fig. 2.

In this forming operation the upper die assembly is forced downwardly by the power press against the bushing 19, and the bearing member 15 in the opening in the machine element 11. In this operation longitudinal pressure on the bushing 19 of ductile material will compress and form this bushing about the bearing member 15 to form a spherical bearing surface for this member in the bushing, and also to spread and form the bushing about the edges of the opening 12 in the machine element 11. This working and forming of the ductile material is done in the recesses 31 and 52 of the lower and upper dies, and the resulting shape of the upper and lower portions of the bushing will depend on the shapes of these recesses. Thus in the arrangement shown, as the two recesses 31 and 52 are tapered, the lower portion of the finished bushing 56, as shown in Fig. 4, will be tapered, as indicated at 54, to correspond with the taper of the recess 31, and the upper portion will be tapered as shown at 55 to correspond with the shape of the recess 52 of the upper die. It will be seen that in this forming operation of the bushing the upper portion is forced inwardly to closely fit the upper portion of the bearing member 15, as indicated at 56a, to complete the spherical bearing surface 57 for the bearing member in the mounting bushing and at the same time the metal of the bushing 19 has been forced around the edges of the opening 12 in the machine element 11 to overlap the opposite sides of this element, as indicated at 58 and 59 of Fig. 4, about the edges of the opening 12 to thus rigidly interlock the bushing with and secure it in the machine element 11. Thus this operation of longitudinally compressing and working the sleeve 19 of ductile material effectively forms it about the bearing member 15 to form a spherical bearing for this member in the bushing and mount it in proper position therein, and also forms the bushing about the edges of the opening 12 in the machine element to interlock the bushing with this element and secure and mount the bushing and the bearing member in the machine element. As the bushing is compressed and formed by the longitudinal pressure of the upper die, the die member 34 in the lower die yields or moves downwardly to permit the lower end of the bushing to be forced into and formed in the recess 31 in the lower die, this downward movement being limited by the lower wall 27a of the socket 27. The lower end 53 of the member 46 in the upper die cooperates with the recess 52 in the upper die to longitudinally compress the bushing 19 and properly shape its upper portion above the machine element 11. The lower end of the plug 50 engages the upper flat end 18 of the bearing member 15 to help position it properly within the sleeve. After the forming and setting operation is completed the upper die assembly is raised to the position of Fig. 1, after which the mounted bearing may be removed and another bushing, bearing and machine element placed within the dies for repeating the operation of mounting another bearing.

Different forms of bushings corresponding to the bushing 19 may be used. In the form of Fig. 5, the bushing indicated at 60 is the same as the bushing 19, except that the outer flange 22 is omitted. The outer wall 61 of this bushing is substantially cylindrical or straight for the length of the bushing. Otherwise this bushing is the same as that shown in Fig. 3 and is formed in the dies the same as described in connection with the bushing of Fig. 3, resulting in the same assembly as shown in Fig. 4.

In Fig. 6 a still further modification for the bushing is shown, in which the bushing indicated at 62 has a substantially straight or cylindrical outer wall 63 and the inner passage through this bushing indicated at 64 is substantially cylindrical and straight through the bushing instead of being provided with a spherical surface 25 on which the bearing member 15 may be seated, as shown in Figs. 3 and 5. In this case the bearing member 15 would seat in the recess 40 in the upper end of the lower die member 34 and would be supported in proper position by this member, as indicated in Fig. 6.

In Fig. 7, as above indicated, the opening 13 through the machine element 11 is shown as being straight instead of being tapered, as shown for the opening 12 in Figs. 3 to 6. Either of the bushings 19, 60 or 62 can be used in this arrangement to form the finished support 56 for the bearing member 15, the same as shown in Fig. 4.

In Fig. 8, the same elements are used and the operations of forming the bushing and mounting the bearing member are the same as in the other forms, except that in this arrangement the opening 14 in the machine element 11 is tapered in the opposite direction from that shown in Figs. 3 to 6, or that is, it is tapered downwardly and inwardly, with the largest diameter at the top side of the element 11.

In carrying out the method in any of these arrangements it will be understood the spherical bearing member 15 may be first placed in the bushing and then the bushing placed within the opening in the machine element 11, or the bushing may be first placed in this opening and then the bearing member placed in the bushing, in positioning these members preparatory to the forming and shaping operations for this bushing in mounting the bearing member in the bushing and mounting both the bushing and bearing member in the machine element 11.

Having thus set forth the nature of my invention, I claim:

1. A method of mounting a self-aligned bearing in a machine element comprising forming an opening in the element, placing a bushing of ductile material in the opening, placing a bearing member having a spherical outer surface in the bushing, forming the bushing to a close fit about the bearing member to form a spherical bearing seat for this member and mount it against longitudinal movement in the bushing and plastically deforming the bushing about the edges of the opening by pressure on opposite ends of the bushing, whereby the bearing member and the bushing are interlocked and the bushing and the edges of the opening are interlocked.

2. A method as claimed in claim 1 in which the deforming is accomplished by longitudinal compression.

3. A method as claimed in claim 1 in which the bushing has a longitudinal passage substantially straight adjacent to one end and substantially spherical adjacent to the other end, and the bearing member is placed in the passage against the spherical part of the passage and the part of the bushing adjacent to the straight end of the passage is deformed about the bearing.

References Cited in the file of this patent

UNITED STATES PATENTS

| | | |
|---|---|---|
| 1,693,748 | Fiegel | Dec. 4, 1928 |
| 1,943,631 | Skillman | Jan. 16, 1934 |
| 2,239,125 | Summers | Apr. 22, 1941 |
| 2,337,742 | Dittmar | Dec. 28, 1943 |
| 2,462,138 | Spangenberg | Feb. 22, 1949 |
| 2,626,841 | Potter | Jan. 27, 1953 |